May 16, 1972 E. P. DESSERT Re. 27,365

MOLDED CASE CIRCUIT BREAKER AND MOUNTING MEANS THEREFOR

Original Filed Feb. 13, 1967

2 Sheets-Sheet 1

INVENTOR.
EDWARD P. DESSERT

BY
Harold J. Patchen

Atty.

MOLDED CASE CIRCUIT BREAKER AND MOUNTING MEANS THEREFOR

Original Filed Feb. 13, 1967

2 Sheets-Sheet 2

INVENTOR.
EDWARD P. DESSERT
BY
Harold J. Wilkes
Atty.

United States Patent Office

Re. 27,365
Reissued May 16, 1972

27,365

MOLDED CASE CIRCUIT BREAKER AND MOUNTING MEANS THEREFOR

Edward P. Dessert, Cedar Rapids, Iowa, assignor to Square D Company, Park Ridge, Ill.

Original No. 3,398,249, dated Aug. 20, 1968, Ser. No. 615,435, Feb. 13, 1967. Application for reissue Feb. 26, 1970, Ser. No. 14,412

Int. Cl. H01h *9/02*

U.S. Cl. 200—168 C 1 Claim

Matter enclosed in heavy brackets [ ] appears in the original patent but forms no part of this reissue specification; matter printed in italics indicates the additions made by reissue.

ABSTRACT OF THE DISCLOSURE

A pair of mounting brackets are removably secured selectively at either the top or bottom of a molded case circuit breaker. When the brackets are at the bottom, the circuit breaker may be mounted with its bottom surface against the outer surface of a panel. When the brackets are at the top, the circuit breaker may be mounted against the inner surface of a panel with an upper portion protruding through an opening in the panel. Screw-type wire connectors at opposite ends of the circuit breaker are reversible so that the wire-clamping screws can be made accessible to a conventional screwdriver irrespective of the mounted position of the circuit breaker.

Background of the invention

Field of the invention.—Details of electric circuit makers and breakers, specifically mounting and terminal means for a molded case circuit breaker.

Description of prior art.—Most molded *case* circuit breakers designed specifically for the protection of branch circuits in buildings are arranged to be plugged into panelboards. Modified versions of these standard circuit breakers without the plug-in feature, termed unit breakers, are provided with non-removable mounting means which permit each of the circuit breakers to be individually secured on the front of a panel with the bottom wall of the circuit breaker held against the panel or are provided with different non-removable mounting means which permit each of the circuit breakers to be secured to the back of a panel with a portion of the circuit breaker protruding through an opening in the panel. Heretofore, the terminals of unit breakers had to be different, depending upon which of the two mounting means were provided, because the panel would otherwise prevent a conventional screwdriver from reaching the clamping screws of the wire connectors in one of the two mounted positions.

Summary of the invention

This invention relates to a molded case circuit breaker and mounting means therefor so constructed and arranged that the circuit breaker can be secured to a panel selectively in either of two positions with the wire connectors of the circuit breaker easily accessible by a tool in either position. Thus the invention renders the manufacture and stocking of two different unit breakers unnecessary.

An improved [molder] *molded* case circuit breaker and mounting means therefor in accordance with this invention comprises a circuit breaker case having four pairs of grooves formed in its side walls, the grooves of each pair being in alignment on opposite sides of the circuit breaker, respectively. Two pairs of the grooves are at the upper portion of the case at opposite ends, respectively, and the other two pairs of the grooves are at the lower portion of the case at opposite ends, respectively. A pair of mounting brackets is provided. Each of the mounting brackets has a pair of legs receivable respectively in the grooves of one of the pairs of grooves and a body portion arranged to be secured to a panel. Screw-type wire connectors at respective ends of the circuit breaker case have the axes of their clamping screws at right angles to the top and bottom walls of the circuit breaker case. The connectors are reversible so that the head of the screw can face the top or bottom of the circuit breaker, selectively.

An object of the present invention is to provide an improved molded case circuit breaker and mounting means therefor.

Another object is to provide an improved molded case circuit breaker and mounting means therefor, which mounting means comprises a pair of mounting brackets and cooperating means on the circuit breaker case for detachably securing the mounting brackets to the circuit breaker case selectively in either of two operative positions.

Another object is to provide an improved molded case circuit breaker and mounting means therefor which permits the circuit breaker to be mounted selectively in either of two positions on a panel, the circuit breaker having wire connector means which are reversible to permit access thereto by a suitable tool irrespective of the mounted position of the circuit breaker.

Description of the preferred [embodiment] *embodiments*

Figure 1:
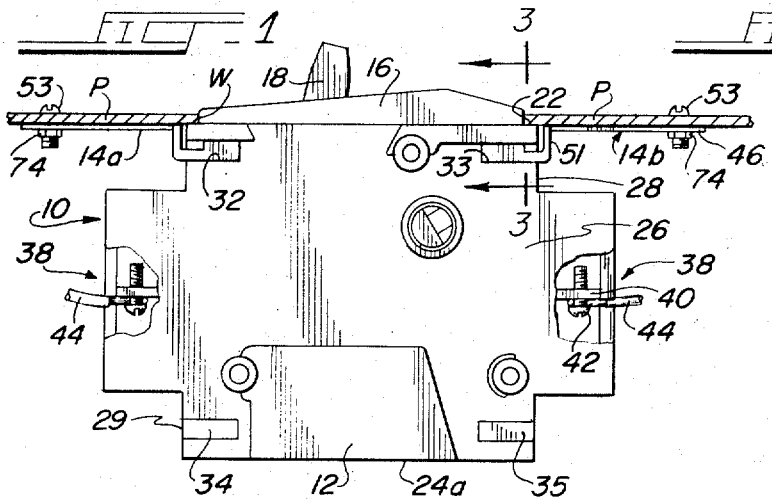
FIG. 1 is a side view of a molded case circuit breaker and mounting means therefor in accordance with the present invention, the circuit breaker being shown in mounted position beneath a panel and with portions of the case broken away to reveal the wire connectors.
Figure 2:
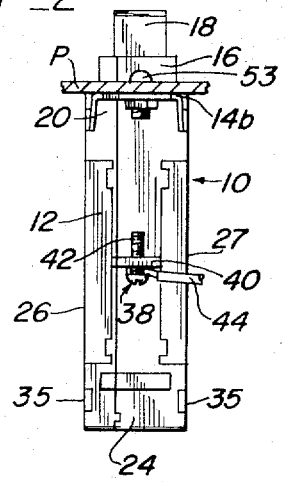
FIG. 2 is an end view taken from the right of FIG. 1.
Figure 3:
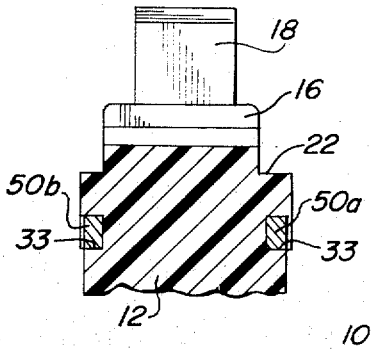
FIG. 3 is a partial sectional view taken generally along the line 3—3 of FIG. 1.

Referring to FIGS. 1, 2, and 3, a molded case circuit breaker 10 having a molded case 12 is mounted beneath a panel P by a mounting means comprising a pair of identical mounting brackets 14a and 14b and cooperating grooves, to be described, in the case 12. An upper portion 16 of the case 12 extends upwardly through a window W in the panel P and has an operating handle 18 protruding [upward] *upwardly* therefrom. The case 12 has a top wall 20 which provides a top mounting surface 22 around the portion 16, a bottom wall 24, a pair of side walls 26 and 27, and a pair of end walls 28 and 29.

Figure 4:
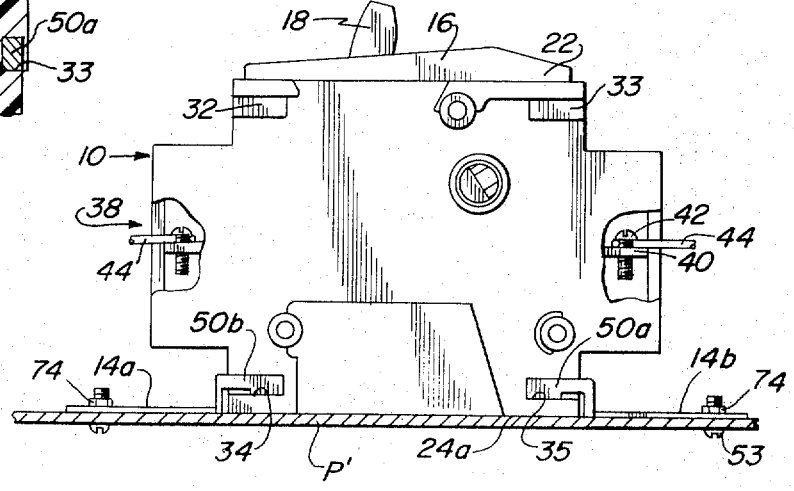
FIG. 4 is a side view of the circuit breaker of FIG. 1, but showing the circuit breaker in mounted position on top of a panel.

In FIG. 4, the circuit breaker 10 is shown mounted above a panel P′ by the same mounting means with a bottom mounting surface 24a of the bottom wall 24 in engagement with the upper surface of the panel P′.

The mounting means comprises, in addition to the brackets 14a and 14b, four pairs of grooves 32, 33 34, and 35 which are formed in the side walls 26 and 27 of the case 12 during the molding operation and which constitute securing means for cooperation with securing means of the brackets 14a and 14b.

Each of the grooves 32, 33, 34, and 35 is rectangular in cross-section, and extends inwardly a short distance from its associated one of the end walls 28 and 29 generally parallel to the top mounting surface 22 and the bottom mounting surface 24a. The respective grooves of each pair are in alignment in the opposite side walls 26 and 27. The pairs of grooves 32 and 33 are at an upper portion of the case 12 a predetermined distance below the top mounting surface 22 and the pairs of grooves 34 and 35 are at a lower portion of the case 12 the same predetermined distance above the bottom mounting surface 24a.

The circuit breaker 10 is provided at opposite ends, between extending portions of the side walls 26 and 27, with respective identical wire connectors 38. Each of the connectors 38 comprises a fixed conducting tab 40 leading into the case 12 and having, in its outer end portion, a threaded opening receiving a wire-clamping screw 42. A wire, such as one of the wires 44, can be clamped between the tab 40 and the undersurface of the head of the screw 42 of each of the connectors 38. Each of the tabs 40 has wiregripping grooves (not shown) surrounding the threaded opening on both its upper and lower surfaces. The arrangement of the case 12 and the tabs 40 is such that the screws 42 may be threaded into their respective tabs 40 from either the bottom, as shown in FIGS. 1 and 2, or from the top, as shown in FIG. 4, to perform its wire clamping function and to permit convenient access to the head of the screw 42 by a screwdriver whether the mounting arrangement of FIGS. 1 and 2 or the mounting arrangement of FIG. 4 is used.

Figure 8:
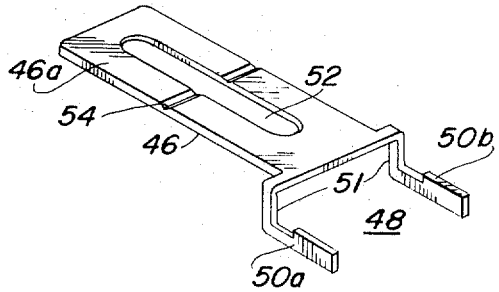
FIG. 8 is a perspective view of a mounting bracket of the mounting means according to the present invention.

As shown best in FIG. 8, each of the brackets 14a and 14b has a generally flat body portion 46 and a generally U-shaped case-engaging or securing means portion 48. A pair of legs 50a and 50b of the case-engaging portion 48 constitute securing means for cooperation with the securing means on the case and are offset from the body portion 46 by respective off-setting portions 51 and extend away from the body portion 46 in a plane parallel thereto. The leg portions 50a and 50b have a cross-sectional size and shape complementary to the grooves 32, 33, 34, and 35 of the case 12 so as to fit snugly therein as shown in FIG. 3. The body portion 46 has a fastening means such as an opening 52, shown as an elongated slot, for receiving a fastener such as one of a pair of bolts 53. A parting groove 54 having a generally V-shaped cross section is provided, as shown in FIG. 8, to permit severance of an end portion 46a from the remainder of the body portion 46 to provide a shortened body portion and an open-ended slot useful in certain installations. The brackets 14a and 14b are preferably made of metal.

Figure 5:
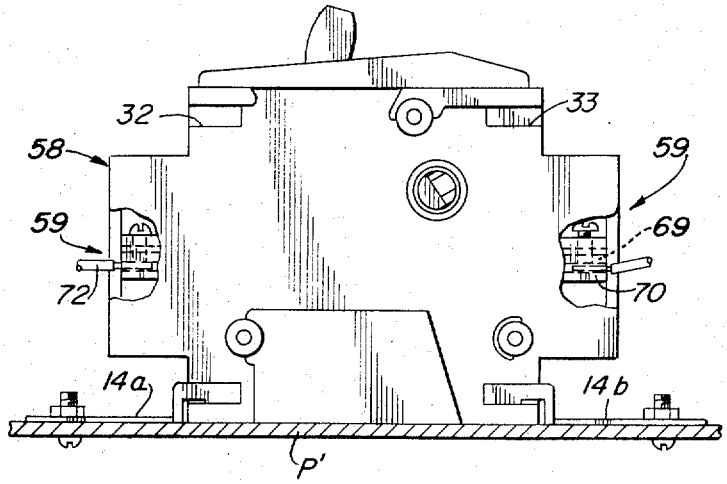
FIGS. 5, 6, and 7 are views similar to FIGS. 4, 2, and 1, respectively, but showing a circuit breaker having modified terminal connectors.
Figure 6:
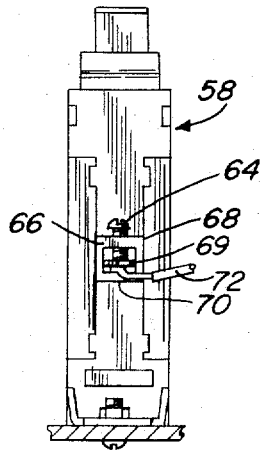
Figure 7:
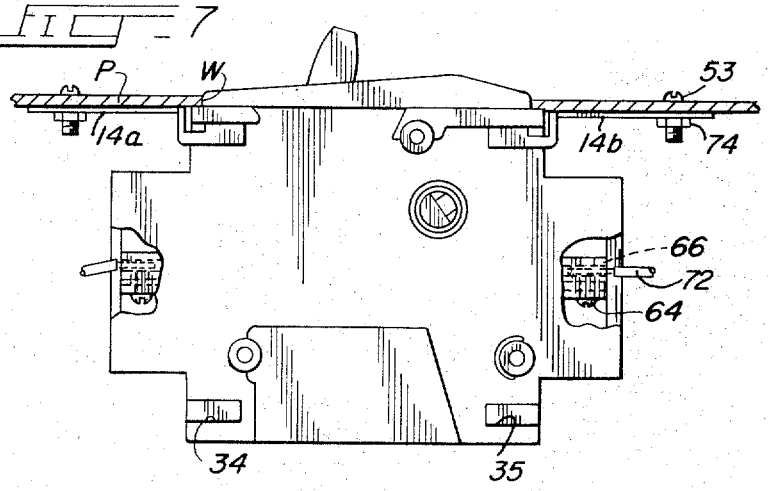

In the modification of FIGS. 5, 6 and 7, a circuit breaker 58 similar to the circuit breaker 10 has, at opposite ends, respectively, a pair of identical wire connectors 59 of greater current-carrying capacity and for accommodating wires of larger size than the wire connectors 38 of the circuit breaker 10. The connectors 59 are also reversible like the connectors 38. Each of the connectors 59 comprises a clamping screw 64 threaded selectively into either a threaded opening in an upper wall portion 66 of an open, generally rectangular clamping frame 68 of the connector or a threaded opening of a lower wall portion 70 of the frame 68 thereby to provide access to the head of the clamping screw 64 regardless of whether the mounting arrangement of FIG. 5 or FIG. 7 is used. The frame 68 of each of the connectors 59 surrounds the outer end portion of a conductive tab 69 which extends into the circuit breaker 58 and which has wire-gripping grooves (not shown) on both its upper and lower faces. One of the faces is engaged by the inner end of the screw 64 to exert clamping pressure on a wire, such as one of the wires 72, held between the opposite face of the tab and one of the wall portions 66 or 70.

Mounting the circuit breakers 10 and 58 in the manner indicated in FIGS. 1, 4, 5, and 7 is readily accomplished. In FIGS. 1 and 7, the legs 50a and 50b of the respective mounting brackets 14a and 14b are received in the respective upper pairs of grooves 32 and 33 and a pair of the bolts 53 extend through respective openings in the panel P and through the openings 52 in the respective mounting brackets 14a and 14b and are secured with nuts 74. Because the leg portions 50a and 50b are offset the same distance from the body portions 46 that the pairs of grooves 32 and 33 are spaced from the upper mounting surface 22 causes the mounting portion 46 to be coplanar with the respective mounting surface 22 and the inner wall of the panel P. The circuit breakers 10 and 58 are thus secured with the front mounting surface 22 held against the marginal area of the panel P surrounding the opening W.

In the mounting arrangement shown in FIGS. 4 and 5, the pair of mounting brackets 14a and 14b have their leg portions 50a and 50b respectively received in the lower pairs of grooves 34 and 35. A pair of the bolts 53 in combination with nuts 74 may be used as in the front mounting arrangement. Because the leg portions 50a and 50b are offset the same distance that the pairs of grooves 34 and 35 are spaced from the bottom mounting surface 24a causes the mounting portions 46 to be coplanar with the surface 24a and the top of the panel P'. The circuit breakers 10 and 58 are thus secured with the surface 24a held against the panel P'.

A feature of the present invention is that removal of the circuit breakers 10 or [15] *58* may be effected by merely loosening the nuts 74 and sliding the mounting brackets 14 out of engagement with the associated grooves of the case whichever mounting arrangement is used. Mounting may be similarly easily accomplished by the reverse of this method.

I claim:

[1. In a molded case circuit breaker and mounting means therefor the combination comprising a circuit breaker having a molded case provided with top and bottom walls and a pair of end walls, and an improved mounting means for mounting the circuit breaker selectively in either of two positions on a panel, an outer surface of the bottom wall of the case being in engagement with the panel in one of said positions and an outer surface of the top wall of the case being in engagement with the panel in the other of said positions, said improved mounting means comprising a pair of elongated mounting brackets each having a fastening means at one end portion for fastening the bracket to the panel and a securing means at the other end portion, upper securing means on the case respectively adjacent the upper two corners of the case defined by the end walls and the top wall, and lower securing means on the case respectively adjacent the lower two corners of the case defined by the end walls and the bottom wall, said securing means on the case and at the other end portions of the brackets being mutually cooperative for detachably securing the pair of brackets to said case at the respective upper two corners or at the respective bottom two corners thereof, selective.]

[2. The combination of claim 1 wherein said case has a pair of side walls and said securing means on the case comprises pairs of opposing grooves in said side walls respectively adjacent said upper and lower corners, the securing means of each of said mounting brackets is a pair of parallel spaced leg portions extending outwardly longitudinally from a body portion of the bracket including said one end portion, said leg portions being removable respectively, in the grooves of each of said pair of grooves for detachably securing the bracket to the case.]

[3. The combination of claim 2 wherein the grooves at the top and bottom of the case are spaced equal distances respectively from said outer surfaces of the top and bottom walls, and the leg portions of each of the mounting brackets are offset from the body portion thereof a like distance.]

[4. The combination of claim 1 wherein the circuit breaker has a pair of screw-type wire connectors extending outwardly from said end walls, respectively, each of said connectors has at least one opening for receiving a wire-clamping screw, the axes of all of the openings being generally parallel to said end walls and the openings being arranged to permit the screws to be threaded into the openings to perform a wire-clamping function with their heads facing either the top wall or the bottom wall, selectively.]

[5. The combination of claim 4 wherein each of the screw-type wire connectors comprises a screw, a rectangular frame having upper and lower wall portions with a conductive tab therebetween, said frame and tab being relatively movable so that said wall portions are movable toward and away from said tab, each of said wall portions having a threaded opening for receiving the screw, selectively, the axes of both of the openings being generally parallel to said end walls, and the inner end of the screw, when received in either opening, engaging the tab to effect said relative movement whereby a wire may be clamped between the tab and either of said wall portions.]

[6. In a molded case circuit breaker and mounting means therefor the combination comprising a circuit breaker having a molded case provided with top and bottom walls, a pair of side walls, a pair of end walls and a pair of screw-type wire connectors extending outwardly from said end walls, respectively, and mounting means for mounting the circuit breaker selectively in either of two positions on a panel, an outer surface of the bottom wall of the case being in engagement with the panel in one of said positions and an outer surface of the top wall of the case being in engagement with the panel in the other of said positions, wherein the improvement comprises said terminals being reversible so that access to the head of the screw can be had from the bottom or the top of the case, selectively, and said mounting means comprises a pair of elongated mounting brackets each having a means at one end for fastening the bracket to the panel and a securing means at the other end, upper securing means on the case respectively adjacent the upper two corners of the case defined by the end walls and the top wall and lower securing means on the case respectively adjacent the lower two corners of the case defined by the end walls and the bottom wall, said securing means on the case and at the other end of the brackets being mutually cooperative for detachably securing the pair of brackets to said case at the upper two corners or at the bottom two corners thereof, selectively.]

*7. In a molded case circuit breaker and mounting means therefor the combination comprising a circuit breaker having a molded case provided with top and bottom walls and a pair of end walls, and an improved mounting means for mounting the circuit breaker selectively in two positions on a panel, an outer surface of the bottom wall of the case being in engagement with the panel in one of said positions and an outer surface of the top wall of the case being in engagement with the panel in the other of said positions, said improved mounting means comprising a pair of elongated mounting brackets each having a fastening means at one end portion for fastening the bracket to the panel and a securing means at the other end portion, upper securing means on the case respectively adjacent the upper two corners of the case defined by the end walls and the top wall, and lower securing means on the case respectively adjacent the lower two corners of the case defined by the end walls and the bottom wall, said securing means on the case and at the other end portions of the brackets being mutually cooperative for detachably securing the pair of brackets to said case selectively at the respective upper two and lower two corners thereof, the circuit breaker having a pair of conductive members extending respectively through said end walls, a pair of rectangular frame members each having upper and lower wall portions disposed respectively on opposite sides of and movable toward and away from the outer end portion of a respective one of said conductive members, said upper and lower wall portions of each of said frame members each having a threaded aperture extending therethrough, and a pair of screws mounted respectively in the frame members, each screw being threadedly mountable selectively in the threaded apertures of the upper and lower wall portions of its respective frame member and adapted to bear against the side of the respective conductive member facing the screw for clamping a wire between the other of the wall portions of the frame member and the opposite side of the conductive member.*

References Cited

The following references, cited by the Examiner, are of record in the patented file of this patent or the original patent.

UNITED STATES PATENTS

| | | | |
|---|---|---|---|
| 2,350,341 | 6/1944 | De Reamer | 339—53 X |
| 2,717,339 | 9/1955 | Brown | 317—119 |
| 2,732,535 | 1/1956 | Hammerly | 339—272 |
| 2,836,687 | 5/1958 | Gelzheiser et al. | 200—168 |
| 2,916,675 | 12/1959 | Middendore | 317—119 |
| 2,795,766 | 6/1957 | Dyer et al. | 339—198 N |

FOREIGN PATENTS

| | | | |
|---|---|---|---|
| 994,653 | 6/1965 | Great Britain | 200—168 B |
| 773,341 | 4/1957 | Great Britain | 200—168 C |

HERMAN O. JONES, Primary Examiner

U.S. Cl. X.R.

200—166 CT; 339—272 R